United States Patent
Wei et al.

(10) Patent No.: US 8,958,774 B2
(45) Date of Patent: *Feb. 17, 2015

(54) METHOD AND APPARATUS FOR DUAL-NETWORK TERMINAL TO COMMUNICATE

(75) Inventors: Yide Wei, Shenzhen (CN); Jianzhong Li, Shenzhen (CN); Qi Yang, Shenzhen (CN); Zhuan Yin, Shenzhen (CN)

(73) Assignee: ZTE Corporation, Shenzhen, Guandong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/634,916

(22) PCT Filed: Jan. 19, 2011

(86) PCT No.: PCT/CN2011/070393
§ 371 (c)(1),
(2), (4) Date: Sep. 14, 2012

(87) PCT Pub. No.: WO2012/051806
PCT Pub. Date: Apr. 26, 2012

(65) Prior Publication Data
US 2013/0196628 A1 Aug. 1, 2013

(30) Foreign Application Priority Data
Oct. 20, 2010 (CN) .......................... 2010 1 0522692

(51) Int. Cl.
| | |
|---|---|
| H04W 88/02 | (2009.01) |
| H04W 8/26 | (2009.01) |
| H04W 12/06 | (2009.01) |
| H04W 88/06 | (2009.01) |
| H04L 29/06 | (2006.01) |

(52) U.S. Cl.
CPC ................ *H04W 88/02* (2013.01); *H04W 8/26* (2013.01); *H04W 12/06* (2013.01); *H04W 88/06* (2013.01); *H04L 63/0853* (2013.01)
USPC ....................... 455/411; 455/552.1

(58) Field of Classification Search
USPC ............................ 455/411, 436, 552.1, 553.1
See application file for complete search history.

(56) References Cited

U.S. PATENT DOCUMENTS

| | | | | |
|---|---|---|---|---|
| 2004/0266435 | A1* | 12/2004 | de Jong et al. ................ | 455/436 |
| 2009/0093269 | A1 | 4/2009 | Lee | |

(Continued)

FOREIGN PATENT DOCUMENTS

| | | |
|---|---|---|
| CN | 101222723 A | 7/2008 |
| CN | 101400180 A | 4/2009 |
| CN | 101754472 A | 6/2010 |

(Continued)

OTHER PUBLICATIONS

International Search Report for PCT/CN2011/070393 dated Jul. 11, 2011.

*Primary Examiner* — Myron K Wyche
(74) *Attorney, Agent, or Firm* — Ling Wu; Stephen Yang; Ling and Yang Intellectual Property (57) ABSTRACT

An apparatus for performing communication by a dual network terminal is disclosed. The dual network terminal is a dual network and dual standby terminal, and the apparatus includes an application subsystem, a 3G wireless communication subsystem, a 2G wireless communication subsystem and an identity identification module. The 3G wireless communication subsystem is connected with 2G wireless communication subsystem, and wireless protocol stacks of the 3G wireless communication subsystem and 2G wireless communication subsystem include a virtual identity identification card administration module respectively. A method for performing communication by a dual network terminal is disclosed, including the 3G wireless communication subsystem reading information of identity identification card in the first virtual identity identification card administration module of 2G wireless communication subsystem into an owned second virtual identity identification card administration module, communicating with 3G network by using information of identity identification card in the second virtual identity identification card administration module.

13 Claims, 3 Drawing Sheets

(56) References Cited

U.S. PATENT DOCUMENTS

2009/0163240 A1* 6/2009 Ryu et al. ............... 455/553.1
2010/0304782 A1* 12/2010 Chang et al. ............ 455/552.1

FOREIGN PATENT DOCUMENTS

| | | |
|---|---|---|
| DE | 10108056 A1 | 8/2002 |
| EP | 2227049 A1 | 9/2010 |

* cited by examiner

METHOD AND APPARATUS FOR DUAL-NETWORK TERMINAL TO COMMUNICATE

TECHNICAL FIELD

The present invention relates to the mobile communication field, and in particular, to a method and apparatus for performing communication by a dual network terminal.

BACKGROUND OF THE RELATED ART

With the construction of the 3rd generation mobile communication (3G) network of China is developed progressively, three major mobile communication operators step into the 3G era formally. However, since in the initial stage of the construction of the current 3G network and the following development period, for the coverage level of the 3G network, compared with the 2nd Generation mobile communication (2G) network which has already been optimized and improved constantly in more than ten years, there is greater difference in no matter the coverage breadth (the 2G network nearly covers all natural villages of our country) or the coverage depth (such as, indoor, basement and subway and so on), major operators simultaneously regards the long-term dual network co-existence of 2G and 3G as their own operation target and policy. China Mobile has especially proposed the Three No principle "No card changing, No number changing, No need to register" and all kinds of the Time Division-Synchronous Code Division Multiple Access (TD-SCDMA)/Global system for Mobile Communications (GSM) dual mode and single standby customized cell phone terminal to popularize and run its own TD-SCDMA 3G network.

But the policy of "co-existence of the 2G and 3G network" and "TD-SCDMA/GSM dual mode and single standby customized terminal" meets the difficult problem in the real operation. On one hand, since the existing "2G and 3G dual mode handoff" policy causes unusual failures, such as the frequent reselection of the cell phone terminal, the serious power consumption, the dropped call, the network being cut-off, even network disconnecting and so on, to take place occasionally and the user experience is worse; on the other hand, since the coverage quality of the existing 3G network is still not so good as the GSM network, which causes that the confidence of the user in the TD-SCDMA network is insufficient. The problem of the network has caused the predicament of the terminal, and conversely, the predicament of the terminal has enlarged the problem of the network.

SUMMARY OF THE INVENTION

The technical problem that the present invention requires to solve is to provide a method and apparatus for performing communication by a dual network terminal, to realize that the dual network terminal communicates with the 2G/3G network by using one Subscriber Identity Module (SIM) card.

In order to solve the above-mentioned problem, the present invention provides a method for performing communication by a dual network terminal, wherein the dual network terminal is a dual network and dual standby terminal, and the dual network and dual standby terminal comprises an application subsystem, a third generation mobile communication (3G) wireless communication subsystem, a second generation mobile communication (2G) wireless communication subsystem and an identity identification module, and an identity identification card is inserted in the identity identification module, the identity identification card stores information for 2G network and 3G network to perform identity authentication, and the 3G wireless communication subsystem and the 2G wireless communication subsystem comprise a virtual identity identification card administration module respectively, the 2G wireless communication subsystem is respectively connected with the application subsystem, the identity identification module and the 3G wireless communication subsystem, and the 3G wireless communication subsystem is connected with the application subsystem and the 2G wireless communication subsystem, and the method comprises:

the 2G wireless communication subsystem reading information in the identity identification card in the identity identification module, storing the information in the identity identification card into an owned first virtual identity identification card administration module, and communicating with the 2G network by using information of the identity identification card in the first virtual identity identification card administration module; and the 3G wireless communication subsystem reading the information of the identity identification card in the first virtual identity identification card administration module in the 2G wireless communication subsystem into an owned second virtual identity identification card administration module, and communicating with the 3G network by using information of the identity identification card in the second virtual identity identification card administration module;

wherein, the first virtual identity identification card administration module is located in a 2G wireless protocol stack of the 2G wireless communication subsystem, and the second virtual identity identification card administration module is located in a 3G wireless protocol stack of the 3G wireless communication subsystem.

The method further comprises:

when a user of the dual network and dual standby terminal initiates a service, the application subsystem selecting a network according to type of service; when the initiated service is a packet switching (PS) service or a videophone service in a circuit switching (CS) service, the application subsystem selecting the 3G network; when the initiated service is the CS service except the videophone service, the application subsystem selecting the 2G network; and when the selected 2G network or 3G network meets a condition of signal intensity, a wireless communication subsystem corresponding to the selected network performing communication through the selected 2G network or 3G network.

The method further comprises:

when the initiated service is the PS service and the application subsystem selects the 3G network, if the application subsystem judges that the PS service is unable to be initiated according to a current signal intensity of the 3G network monitored by the 3G wireless communication subsystem, notifying the 2G wireless communication subsystem to activate a 2G data link of the 2G network and initiating the service; and when the initiated service is the PS service, in a process of the 3G wireless communication subsystem performing communication through the 3G network, if the application subsystem judges that the current signal intensity of the 3G network is weakened to be unable to bear the PS service according to the current signal intensity of the 3G network monitored by the 3G wireless communication subsystem, then the application subsystem notifying the 3G wireless communication subsystem and the 2G wireless communication subsystem to switch a packet data protocol (PDP) data link corresponding to the PS service from a 3G data link to a 2G data link.

The method further comprises:

when the 2G wireless communication subsystem uses the 2G data link to perform the PS service, and when the application subsystem judges that the current signal intensity of the 3G network is enhanced to be able to bear the PS service according to the current signal intensity of the 3G network monitored by the 3G wireless communication subsystem, then the application subsystem notifying the 3G wireless communication subsystem and the 2G wireless communication subsystem to switch the PDP data link corresponding to the PS service from the 2G data link to the 3G data link.

Wherein, in the step of the 2G wireless communication subsystem reading information in the identity identification card in the identity identification module and storing the information in the identity identification card into an owned first virtual identity identification card administration module, the 2G wireless communication subsystem stores one or more of three parameters, a public land mobile network (PLMN) identification, a Temporary Mobile Subscriber Identity (TMSI) and a Location Area Identification (LAI) in the identity identification card, into the first virtual identity identification card administration module.

The method further comprises:

in the process of the 3G wireless communication subsystem communicating with the 3G network, if all International Mobile Subscriber Identification Number (IMSI) of the identity identification card needs to be sent to the 3G network, then the 3G wireless communication subsystem asynchronously accessing the identity identification card in the identity identification module through the 2G wireless communication subsystem and obtaining the IMSI of the identity identification card.

Wherein, the 3G network is a Time Division-Synchronous Code Division Multiple Access (TD-SCDMA) network, a Wideband Code Division Multiple Access (WCDMA) network or a CDMA2000, and the 2G network is a global system for mobile communications (GSM) network or a Code Division Multiple Access (CDMA) Network.

In order to solve the above-mentioned problem, the present invention further provides an apparatus for performing communication by a dual network terminal, wherein the dual network terminal is a dual network and dual standby terminal, and the apparatus comprises an application subsystem, a third generation mobile communication (3G) wireless communication subsystem, a second generation mobile communication (2G) wireless communication subsystem and an identity identification module, and the 2G wireless communication subsystem is respectively connected with the identity identification module and the 3G wireless communication subsystem, and the 3G wireless communication subsystem is connected with the 2G wireless communication subsystem, and wireless protocol stacks of the 3G wireless communication subsystem and the 2G wireless communication subsystem comprise a virtual identity identification card administration module respectively, wherein, an identity identification card is inserted in the identity identification module, and the identity identification card is configured to store information for 2G network and 3G network to perform identity authentication;

the 2G wireless communication subsystem is configured to read information in the identity identification card in the identity identification module, store the information in the identity identification card into an owned first virtual identity identification card administration module, and communicate with the 2G network by using information of the identity identification card in the first virtual identity identification card administration module; and the 3G wireless communication subsystem is configured to read the information of the identity identification card in the first virtual identity identification card administration module of the 2G wireless communication subsystem into an owned second virtual identity identification card administration module, and communicate with the 3G network by using information of the identity identification card in the second virtual identity identification card administration module.

Wherein, the apparatus further comprises an application subsystem, connected with the 2G wireless communication subsystem and the 3G wireless communication subsystem respectively;

the application subsystem is configured to: when a user of the dual network and dual standby terminal initiates a service, select a network according to type of service; when the initiated service is a packet switching (PS) service or a videophone service in a circuit switching (CS) service, select the 3G network and notify the 3G wireless communication subsystem; when the initiated service is the CS service except the videophone service, select the 2G network and notify the 2G wireless communication subsystem;

the 3G wireless communication subsystem is further configured to: monitor a current signal intensity of the 3G network, and notify the current signal intensity of the 3G network to the application subsystem; and when the application subsystem selects the 3G network and the 3G network meets a condition of signal intensity, communicate through the 3G network; and the 2G wireless communication subsystem is further configured to: when the application subsystem selects the 2G network and the 2G network meets the condition of the signal intensity, communicate through the 2G network.

Wherein, the application subsystem is further configured to: when the initiated service is the PS service and when judging that the PS service is unable to be initiated according to the current signal intensity of the 3G network monitored by the 3G wireless communication subsystem, notify the 2G wireless communication subsystem to activate a 2G data link of the 2G network and initiate the PS service; and when the initiated service is the PS service, in a process of performing communication through the 3G network, if judging that the current signal intensity of the 3G network is weakened to be unable to bear the PS service according to the current signal intensity of the 3G network monitored by the 3G wireless communication subsystem, notify the 3G wireless communication subsystem and the 2G wireless communication subsystem to switch a PDP data link corresponding to the PS service from a 3G data link to the 2G data link; and when the 2G wireless communication subsystem uses the 2G data link to perform the PS service, and when judging that the current signal intensity of the 3G network is enhanced to be able to bear the PS service according to the current signal intensity of the 3G network monitored by the 3G wireless communication subsystem, notify the 3G wireless communication subsystem and the 2G wireless communication subsystem to switch the PDP data link corresponding to the PS service from the 2G data link to the 3G data link.

Wherein, the 2G wireless communication subsystem is further configured to: when reading information in the identity identification card in the identity identification module and storing the information in the identity identification card into the first virtual identity identification card administration module, store one or more of three parameters, a public land mobile network (PLMN) identification, a Temporary Mobile Subscriber Identity (TMSI) and a Location Area Identification (LAI) in the identity identification card, into the first virtual identity identification card administration module.

Wherein, the 3G wireless communication subsystem is further configured to: in the process of communicating with the 3G network, if an International Mobile Subscriber Identification Number (IMSI) of the identity identification card needs to be sent to the 3G network, then asynchronously access the identity identification card in the identity identification module through the 2G wireless communication subsystem and obtain the IMSI of the identity identification card.

Wherein, the 3G network is a Time Division-Synchronous Code Division Multiple Access (TD-SCDMA) network, a Wideband Code Division Multiple Access (WCDMA) network or a CDMA2000, and the 2G network is a global system for mobile communications (GSM) network or a Code Division Multiple Access (CDMA) Network.

By adopting the method and apparatus of the present invention, it realizes the dual network and dual standby function only by using a single SIM card, and compared with other terminal of dual network and dual standby and dual card and dual number, it is conducive to the design of the hardware and structure and the cost is saved. Compared with the current 2G/3G dual mode and single standby terminal technology, the present invention, when giving consideration to the CS circuit domain service specialty of the 2G network and the data service specialty of the 3G network, reduces the probability of the dual mode switching through dual network and dual standby technology (only part of switching in the data service), which fundamentally reduces and avoids the failures, such as frequent reselection of the network, serious power consumption, the dropped call of the conversation, the network disconnecting and so on, caused by the 2G/3G dual mode and single standby terminal due to the "2G and 3G dual mode switching" policy. It improves the user experience of the terminal, and also promotes the development of the TD-SCDMA network.

PREFERRED EMBODIMENTS OF THE PRESENT INVENTION

The present invention mainly aims at the situation that the dual network and dual standby terminal adopts a dual network and dual standby and single card and single number of dual modem architecture.

Figure 1:
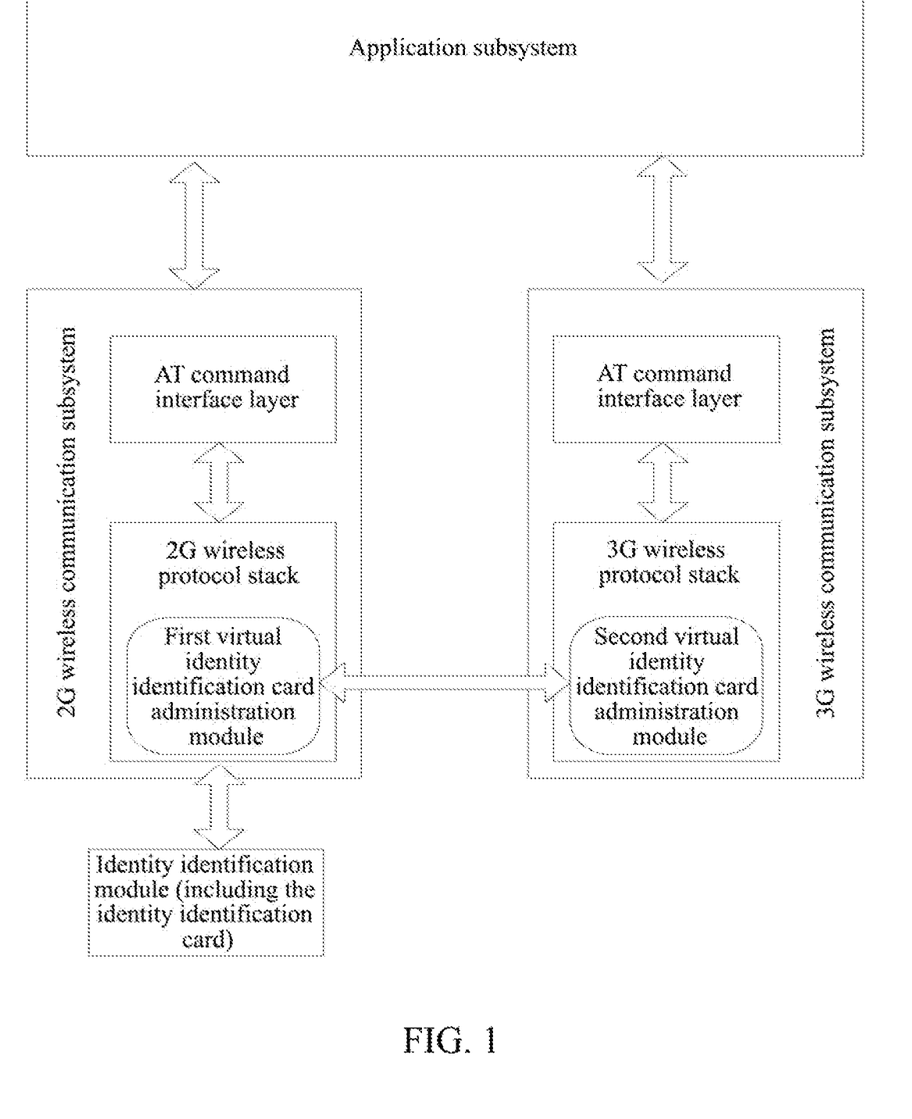
FIG. 1 is a schematic diagram of an apparatus for performing communication by a dual network and dual standby terminal according to an embodiment of the present invention.

As shown in FIG. 1, the dual network and dual standby terminal includes an application (AP) subsystem, a 3G wireless communication subsystem, a 2G wireless communication subsystem and an identity identification module (SIM card module), and an identity identification card (SIM card) is inserted in the identity identification module, and the identity identification card stores information for 2G network and 3G network to perform identity authentication, and the 2G wireless communication subsystem is connected with the application subsystem, the identity identification module and the 3G wireless communication subsystem respectively, and the 3G wireless communication subsystem is connected with the application subsystem and the 2G wireless communication subsystem.

The 3G wireless communication subsystem and the 2G wireless communication subsystem constitute the wireless communication (CP) subsystem.

In the present invention, the 3G wireless communication subsystem and the 2G wireless communication subsystem include a virtual identity identification card administration (SIM Proxy, also called SIM card virtual proxy area) module respectively. Wherein, the 2G wireless communication subsystem includes the first virtual identity identification card administration module and the 3G wireless communication subsystem includes the second virtual identity identification card administration module, to realize that two wireless communication subsystems manage and use one SIM card together, thus it can make the use and management of the SIM card more flexible and efficient.

Specifically, the 2G wireless communication subsystem reads the information in the identity identification card in the identity identification module, stores the information in the identity identification card into an owned first virtual identity identification card administration module, and communicates with the 2G network by using the information of the identity identification card in the first virtual identity identification card administration module; and the 3G wireless communication subsystem reads the information of the identity identification card in the first virtual identity identification card administration module of the 2G wireless communication subsystem into an owned second virtual identity identification card administration module, and communicates with the 3G network by using the information of the identity identification card in the second virtual identity identification card administration module.

In the present embodiment, two independent wireless communication subsystems construct one SIM Proxy (virtual SIM card administration module) respectively in the protocol stack, that is, the first virtual identity identification card administration module is located in a 2G wireless protocol stack of the 2G wireless communication subsystem, and the second virtual identity identification card administration module is located in a 3G wireless protocol stack of the 3G wireless communication subsystem. One SIM card is accessed and managed through the virtual software manner and the dual network and dual standby function is realized based on using one SIM card.

In another embodiment, the wireless communication subsystems also can construct one SIM Proxy in the AT command interface layer respectively, and its realization way is similar, which will not be detailed again.

After the 2G wireless communication subsystem reads the information in the identity identification card in the identity identification module, it can store all or part of information in the identity identification card into the first virtual identity identification card administration module, for example, it can store one or more of three parameters, a public land mobile network (PLMN) identification, a Temporary Mobile Subscriber Identity (TMSI) and a Location Area Identification (LAI) in the identity identification card, into the first virtual identity identification card administration module. Then, the 3G wireless communication subsystem reads the information of the identity identification card in the first virtual identity identification card administration module, and stores it into the second virtual identity identification card administration module.

In addition, the International Mobile Subscriber Identification Number (IMSI) of the identity identification card can be not stored in the first virtual identity identification card administration module and the second virtual identity identification card administration module, while in the process of the 3G wireless communication subsystem communicating with the 3G network, if an IMSI of the identity identification card needs to be sent to the 3G network, then the 3G wireless communication subsystem asynchronously accesses the identity identification card in the identity identification module through the 2G wireless communication subsystem and obtain the IMSI of the identity identification card.

In the embodiment of the present invention, the service distribution can be performed, that is: aiming at the characteristic that the bandwidth of the 3G network is larger and suitable for the data service and the 2G network optimization work is accumulated more and the 2G service, such as voice, is supported better, by using the 2G and 3G dual network and dual standby, it realizes the service distribution of the Packet Switching (PS) service and the Circuit Switching (CS) service (that is, the 2G network bears the CS service and the 3G network bears the PS data service) in the terminal side, to avoid the problem brought by the coexisting of the 2G and 3G network at present.

Specifically, when a user of the dual network and dual standby terminal initiates a service, the application subsystem selects the network according to the type of service, and when the initiated service is a PS service or a videophone service in a CS service, the application subsystem selects the 3G network, and when the initiated service is a CS service except the videophone service, the application subsystem selects the 2G network; and when the selected network meets the condition of signal intensity, the wireless communication subsystem corresponding to the selected network performs the communication through the selected network.

Although the videophone service is the service based on the CS circuit domain, since it must be borne through the 3G network, the 3G network needs to be selected when the user initiates the videophone service.

The above-mentioned condition of the signal intensity being met refers that the signal intensity of the network can bear the relevant service (that is, the initiated service). In specific implementation, it is judged that the condition of the signal intensity is met when the signal intensity of the network is greater than the designated threshold.

In the present invention, it can adopt the following way to adjust the initiated PS service, including:

1, when the initiated service is a PS service and the application subsystem selects the 3G network, if the application subsystem judges that the PS service is unable to be initiated according to the current signal intensity of the 3G network monitored by the 3G wireless communication subsystem, the 2G wireless communication subsystem is notified to activate a 2G data link of the 2G network and initiate the service;

2, when the initiated service is a PS service, in a process of the 3G wireless communication subsystem performing the communication through the 3G network, if the application subsystem judges that the current signal intensity of the 3G network is weakened to be unable to bear the PS service according to the current signal intensity of the 3G network monitored by the 3G wireless communication subsystem, then the application subsystem notifies the 3G wireless communication subsystem and the 2G wireless communication subsystem to switch a packet data protocol (PDP) data link corresponding to the PS service from a 3G data link to a 2G data link.

3, when the 2G wireless communication subsystem uses the 2G data link to perform the PS service, and when the application subsystem judges that the current signal intensity of the 3G network is enhanced to be able to bear the PS service according to the current signal intensity of the 3G network monitored by the 3G wireless communication subsystem, then the application subsystem notifies the 3G wireless communication subsystem and the 2G wireless communication subsystem to switch the PDP data link corresponding to the PS service from the 2G data link to the 3G data link.

In specific implementation, the application subsystem judges the current signal intensity of the 3G network, and if the signal intensity of 3G network is less than or equal to the designated threshold, it is judged that the PS service cannot be initiated or the PS service cannot be borne; if greater than the designated threshold, it is judged that the PS service can be borne. Certainly, the designated threshold used in the above-mentioned three situations can be the same, and also can be different.

In addition, for the situation that the initiated service is a videophone service, but the application subsystem judges that it is unable to initiate the videophone service according to the current signal intensity of the 3G network monitored by the 3G wireless communication subsystem, the application subsystem controls the videophone service to fall back to the ordinary voice service, and then notifies the 2G wireless communication subsystem to initiate the voice service.

The above-mentioned 3G network can be a Time Division-Synchronous Code Division Multiple Access (TD-SCDMA) network, a Wideband Code Division Multiple Access (WCDMA) network and a CDMA2000 network, and 2G network can be a GSM network, a Code Division Multiple Access (CDMA) network and so on. In the embodiment and application example of the present invention, it is described mainly by regarding the 3G network as the TD-SCDMA network and the 2G network as the GSM network, but it is not limited herein, and other types of 3G network and 2G network are also applicable to the present invention.

The application example is further described by regarding the 3G network as the TD-SCDMA network and the 2G network as the GSM network hereinafter.

Figure 2:
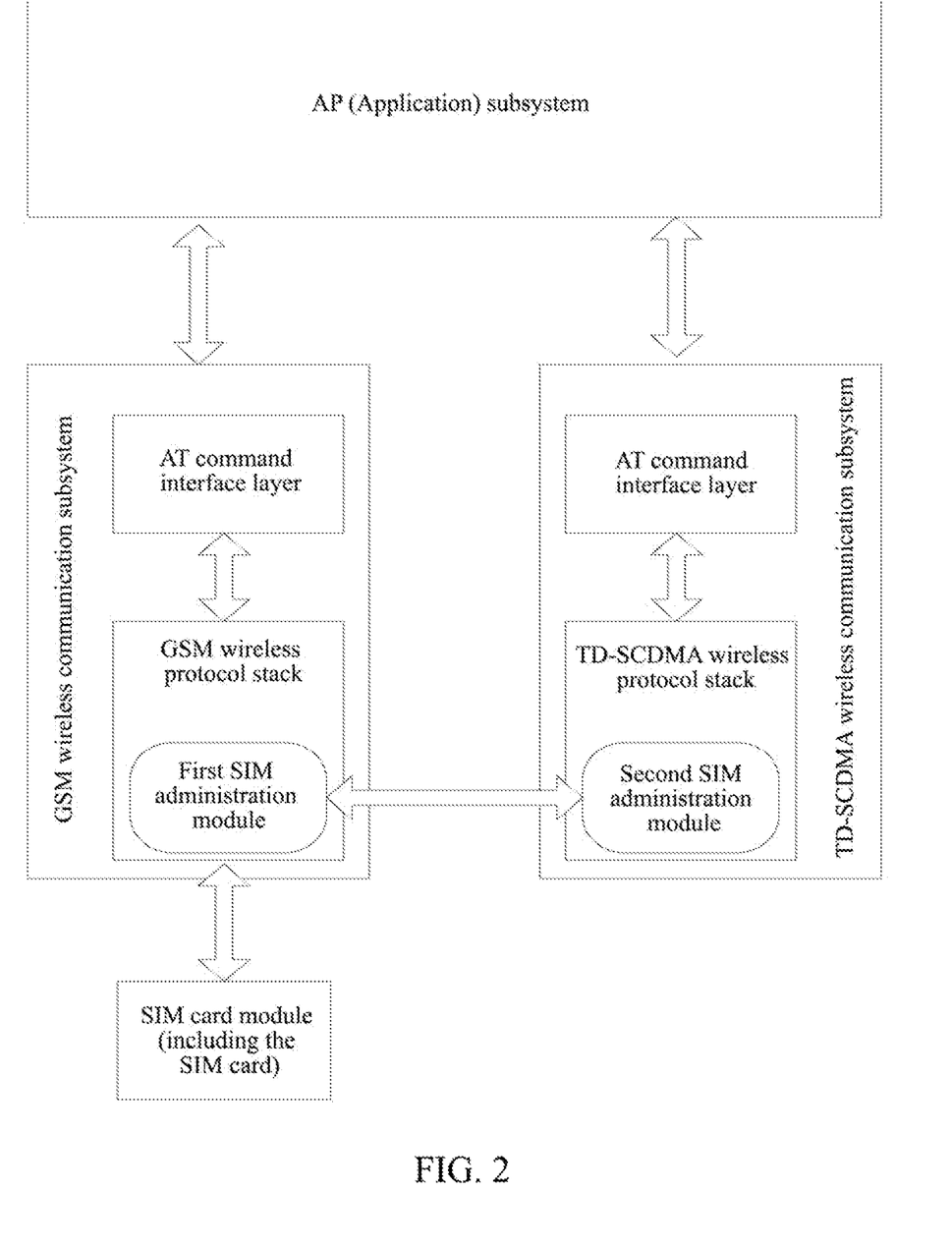
FIG. 2 is a schematic diagram of an apparatus for performing communication by a dual network and dual standby terminal according to an application example of the present invention.
Figure 3:
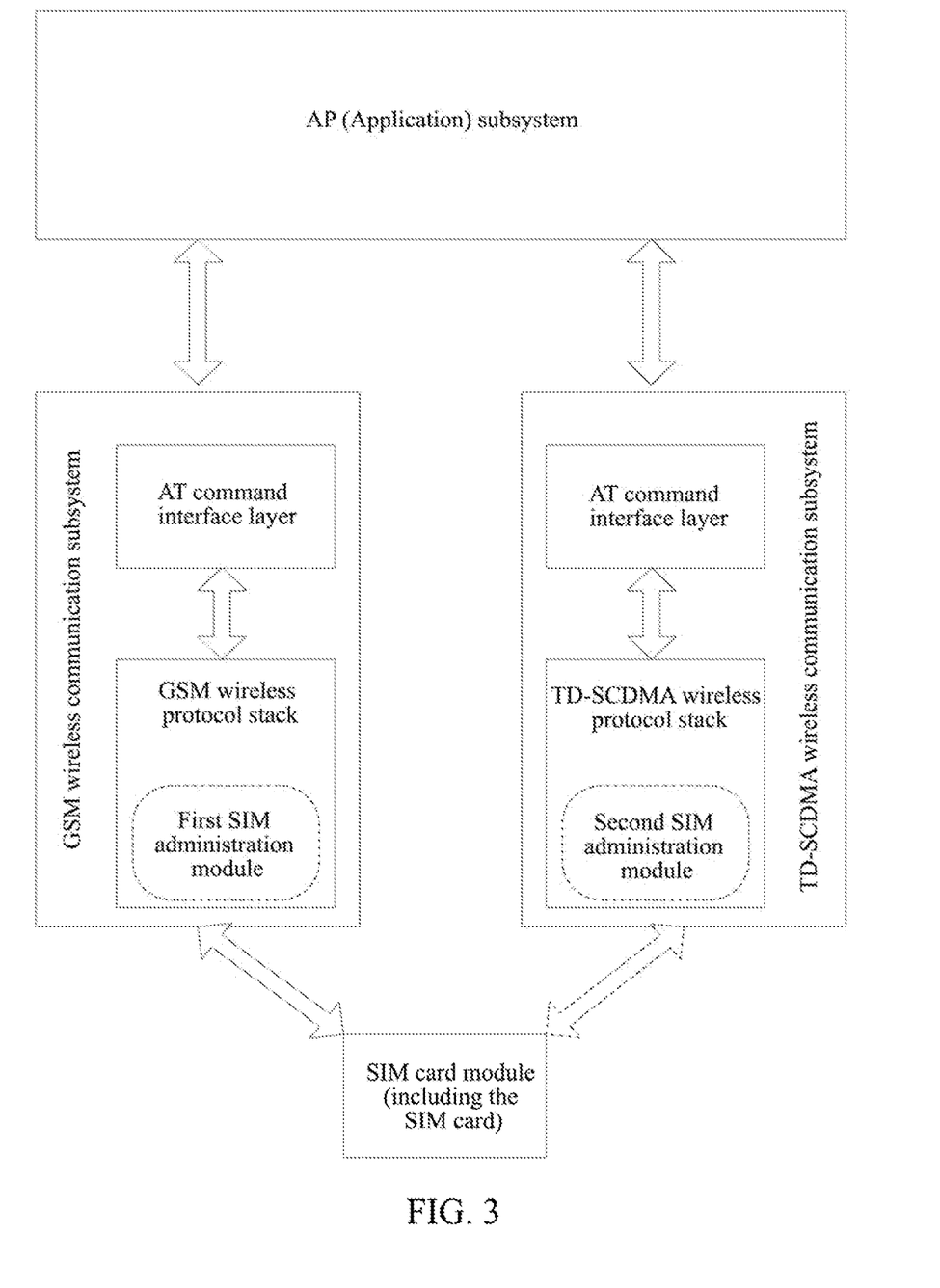
FIG. 3 is an effect diagram of an apparatus for performing communication by a dual network and dual standby terminal according to an application example of the present invention.

As shown in FIG. 2, the present example uses the TD-SCDMA/GSM dual network and dual standby mobile phone of the three-core architecture of "AP (application)+TD-SCDMA Modem (wireless)+GSM Modem (wireless)" to realize the 2G and 3G network bearing distribution of the CS and PS services, wherein the AP part is the main module responsible for application, and two wireless communication subsystems, the TD-SCDMA modem and the GSM modem, are respectively responsible for the interaction with 2G network and 3G network. In order to realize the function that two wireless modules use one SIM card together, since the frequency of the user using the CS service is much higher than the frequency of using the PS service, the SIM card slot (the identity identification module) is connected to the GSM Modem. One SIM Proxy is constructed in the wireless protocol stacks of the TD-SCDMA modem and GSM modem respectively, and the GSM modem can access the SIM card directly during initialization and stores the data of the SIM card in the SIM Proxy, and the TD-SCDMA Modem accesses the SIM card through the SIM Proxy, which realizes the function that two independent wireless communication subsystems access the same SIM card in theory and achieves the objective of the dual network and dual standby and single card and single number.

As shown in FIG. 2, the apparatus for realizing the CS and PS service distribution of the 2G and 3G dual network and dual standby terminal based on the dual network and dual standby and single card and single number of the application example includes the following modules:

A, AP (Application) Subsystem the AP subsystem has an application processor module with independent CPU, and it is a master control system of the cell phone terminal and is responsible for interacting with the user; if the user needs to perform operations in the aspect of the wireless communication or the SIM card, the system is responsible for controlling the corresponding wireless communication system to finish the related function. The subsystem has the following functions in the present example:

1, according to the principle that "the CS service runs in the 2G network and the PS service runs in the 3G network", each service is classified; when the user initiates the service, if it is judged to be the CS service, it is initiated from the GSM wireless communication subsystem; if it is the PS service, it is initiated from the TD-SCDMA wireless communication subsystem. Wherein, since the CS64 kbps videophone is the specific service of the TD-SCDMA network, the videophone service also can be initiated through the TD-SCDMA wireless communication subsystem.

2, the current PS service policy of the terminal is adjusted according to the signal intensity of the TD-SCDMA network where the terminal is located, wherein the TD-SCDMA wireless communication subsystem is responsible for monitoring the signal intensity of the TD-SCDMA network. For example:

when the signal intensity of the TD-SCDMA network where the terminal is located monitored by the TD-SCDMA wireless communication subsystem is not enough to support initiating the relevant data service, the application subsystem can activate the 2G data link to initiate the relevant service through the GSM wireless communication subsystem.

In the process that the terminal is using the default TD-SCDMA network to perform the data service, when the signal intensity of the location where the terminal is located is weakened to be not enough to support the relevant service to be performed normally, the application subsystem is responsible for switching the relevant PDP data link to the 2G data link for which the GSM wireless communication subsystem is responsible, in order to continue the relevant service to be performed normally.

B, The GSM Wireless Communication Subsystem the GSM wireless communication subsystem is responsible for interacting with the GSM network and bearing various CS services, and it is responsible for performing the initialization work on the SIM, which can include the AT command interface layer and the GSM wireless protocol stack.

The GSM wireless communication subsystem includes a GSM Modem (in the present example, it is believed that the GSM wireless communication subsystem is the GSM Modem), which is mainly responsible for bearing all CS circuit domain services except the videophone service of the whole terminal and bearing the relevant data service temporarily through the 2G data link when the TD signal is not good.

One SIM Proxy (the first SIM Proxy) is constructed in the GSM wireless protocol stack of the GSM modem, and in the starting process, it is responsible for the initializing the SIM card and reading out most parameters of the SIM card and storing them into the SIM Proxy in the GSM Modem side, such as, PLMN identification, TMSI, LAI and so on, which are prepared to be read by the SIM Proxy in the TD-SCDMA Modem side to finish the network registration of the TD-SCDMA Modem.

The GSM Modem connects to the TD-SCDMA Modem by using the hardware, for example, through the Universal Asynchronous Receiver/Transmitter (UART), the Universal Serial Bus (USB), the I2C bus and so on, which is convenient for TD-SCDMA Modem to read the parameters of the SIM card from the SIM Proxy of the GSM Modem when the initialization is performed.

C, The TD-SCDMA Wireless Communication Subsystem the TD-SCDMA wireless communication subsystem is responsible for interacting with the TD-SCDMA network and bearing various PS services and the videophone function, which can include the AT command interface layer and the TD-SCDMA wireless protocol stack.

The TD-SCDMA wireless communication subsystem includes the TD-SCDMA Modem (in the present example, it is believed that the TD-SCDMA wireless communication subsystem is the TD-SCDMA Modem). The TD-SCDMA Modem of the present example is different from the commercial TD-SCDMA Modem at present, and it does not have the TD-SCDMA/GSM dual mode switching function and only works in the "TD-SCDMA ONLY" mode. It is mainly responsible for the data interaction of the data service and videophone service based on the TD-SCDMA network, and monitoring the signal intensity of the TD-SCDMA network where the terminal is currently located; when the signal is weakened to a certain value, it notifies the AP subsystem to switch the PS service to the GSM wireless communication subsystem.

The TD-SCDMA wireless communication subsystem side also constructs one SIM Proxy (the second SIM Proxy) in the TD-SCDMA wireless protocol stack. When the TD-SCDMA modem is initialized, most parameters of the SIM card in the SIM proxy of the GSM Modem side are read and stored in the SIM Proxy area of the TD-SCDMA modem side through the hardware channel, and the SIM card does not need to be accessed directly, which can save the initialization time. But the authentication algorithm (the network side needs the IMSI information of the SIM card) is involved, so the TD-SCDMA modem is still required to asynchronously access the SIM card through the hardware channel, which usually needs to ensure that it is finished within 200 ms, so the channel driver of the hardware needs to ensure the requirement of speed. On the effect, this procedure equals that two Modems access the same SIM card at the same time, which realizes the function of the dual network and dual standby and single card and single number.

D, The SIM Card Module (the Identity Identification Module)

a SIM card (the identity identification card) is inserted in the SIM card module, and the SIM card stores the information used for the GSM network and the TD-SCDMA network to perform the identity authentication.

In the starting and initialization process, since the SIM card is actually connected to the GSM Modem, the TD-SCDMA modem accesses the SIM card through the virtual way, and in the starting process, the GSM Modem should be powered on at first, and the GSM Modem finishes the initialization of the SIM card firstly and it is responsible for reading out most parameters of the SIM card and storing them in the SIM Proxy of the GSM Modem side, such as, the PLMN identification, TMSI, and LAI and so on. And then the TD-SCDMA Modem is powered on, and the TD-SCDMA Modem reads most parameters of the SIM into local SIM Proxy from the SIM Proxy of the GSM Modem firstly, and then initiates the initialization procedure of the protocol stack; the authentication algorithm is involved, so the TD-SCDMA modem is still required to asynchronously access the SIM card through the hardware channel, and the IMSI number of the same SIM card will be finally reported to the respective corresponding TD-SCDMA network and GSM network.

Taking the ordinary voice telephone service as an example, when the user makes a voice call through the dialing interface, the application subsystem, according to the logic that "the CS service runs in the GSM network and the PS service runs in the TD-SCDMA network", calls the GSM wireless communication subsystem to interact with the GSM network and the service performed with each other is borne through the GSM network. When being called, the network equipment, according to the information registered in the network side by the terminal (mainly the IMSI number used by the terminal when registering in the GSM network), establishes the link with the GSM wireless communication subsystem of the terminal and bears the service. Other CS service procedures, such as the short message and so on, are same.

It needs to be illustrated that, since the TD-SCDMA videophone service based on the CS circuit domain needs the TD-SCDMA network to perform the bearing, after the user initiates the call, the application subsystem will call the TD-SCDMA wireless communication subsystem to perform interaction and data bearing with the TD-SCDMA network. And when being called, the network equipment, according to the information registered in the network side by the terminal (mainly IMSI number used by the terminal when registering in the TD-SCDMA network), establishes the link with the TD-SCDMA wireless communication subsystem of the terminal and bears the service.

When the user surfs the Internet through the browser, after the user inputs the relevant website address in the browser, the application subsystem searches for the signal intensity of the TD-SCDMA network where the terminal is currently located through the TD-SCDMA wireless communication subsystem firstly. When the application subsystem knows that the network signal meets the requirement, and then it establishes the data link channel based on the TD-SCDMA network and perform the interaction of the relevant service data through the TD-SCDMA wireless communication subsystem and the corresponding network service equipment. When the application subsystem knows that the network signal does not meet the requirement, the application subsystem will initiatively establish the data link channel based on the GSM network to substitute the TD-SCDMA network to finish the networking service through the GSM wireless communication subsystem and the corresponding network service equipment. Certainly, when the terminal surfs the Internet by using the default TD-SCDMA wireless communication subsystem and the TD-SCDMA network, and when the network signal is weakened to be not enough to meet the service requirement, the application subsystem of terminal will disconnect the PDP data link based on the TD-SCDMA network initiatively through the TD-SCDMA wireless communication subsystem, and immediately calls GSM wireless communication subsystem to make the terminal and GSM network establish the data link, to maintain the networking service. On the contrary, when the terminal surfs the Internet by using the GSM wireless communication subsystem and GSM network temporarily, and when the application subsystem of terminal knows that the TD-SCDMA network signal recovers and meets the requirement of data service through the TD-SCDMA wireless communication subsystem, it will switch the relevant PDP data link back to the TD-SCDMA data link.

Other format of data service is basically similar to the procedure of surfing the Internet through the browser, which will not be described here. However, for the multimedia message and the PushMail of the mail service, due to the special PUSH notification message mechanism in its service procedure, the interaction procedure is a little more complex when receiving the relevant multimedia message and PushMail mail passively. Since the PUSH notification message belongs to the CS domain, the network side will send the relevant PUSH notification message to the application subsystem of terminal through the GSM network and the GSM communication subsystem firstly, and then the application subsystem of terminal performs scheduling based on the relevant PS service policy according to the current network situation.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limit to any specific form of the combination of the hardware and software.

The above description is only the preferred embodiments of the present invention and is not intended to limit the present invention. For those skilled in the art, the present invention can have various modifications and variations. All of modifications, equivalents and/or variations without departing from the spirit and essence of the present invention should be included in the protection scope of the present invention.

INDUSTRIAL APPLICABILITY

In the present invention, the dual network and dual standby function is only realized by using a single SIM card, and compared with other terminal of dual network and dual standby and dual card and dual number, it is conducive to the design of the hardware and structure and the cost is saved. Compared with the current 2G/3G dual mode and single standby terminal technology, the present invention, when giving consideration to the CS circuit domain service specialty of the 2G network and the data service specialty of the 3G network, reduces the probability of the dual mode switching through dual network and dual standby technology (only part of switching in the data service), which fundamentally reduces and avoids the failures, such as frequent reselection of the network, serious power consumption, the dropped call of the conversation, the network disconnecting and so on, caused by the 2G/3G dual mode and single standby terminal due to the "2G and 3G dual mode switching" policy. It improves the user experience of the terminal, and also promotes the development of the TD-SCDMA network.

What we claim is:

1. A method for performing communication by a dual network terminal, characterized in that
the dual network terminal is a dual network and dual standby terminal, and the dual network and dual standby terminal comprises an application subsystem, a third generation mobile communication (3G) wireless communication subsystem, a second generation mobile communication (2G) wireless communication subsystem and an identity identification module, wherein,
the dual network terminal includes only one identity identification card which is inserted in the identity identification module, and the identity identification card stores information for 2G network and 3G network to perform identity authentication, the 2G wireless communication subsystem comprises a first virtual identity identification card administration module, and the 3G wireless communication subsystem comprises a second virtual identity identification card administration module, the 2G wireless communication subsystem is respectively connected with the application subsystem, the identity identification module and the 3G wireless communication subsystem, and the 3G wireless communication subsystem is connected with the application subsystem and the 2G wireless communication subsystem, and the method comprises:

the 2G wireless communication subsystem reading information in the identity identification card in the identity identification module, storing the information in the identity identification card into said first virtual identity identification card administration module, and communicating with the 2G network by using the information of the identity identification card in the first virtual identity identification card administration module; and the 3G wireless communication subsystem reading the information of the identity identification card in the first virtual identity identification card administration module of the 2G wireless communication subsystem into said second virtual identity identification card administration module through a hardware channel, and communicating with the 3G network by using the information of the identity identification card in the second virtual identity identification card administration module;

wherein, the first virtual identity identification card administration module is located in a 2G wireless protocol stack of the 2G wireless communication subsystem, and the second virtual identity identification card administration module is located in a 3G wireless protocol stack of the 3G wireless communication subsystem.

2. The method according to claim 1, further comprising:
when a user of the dual network and dual standby terminal initiates a service, the application subsystem selecting a network according to a type of the service, and when the initiated service is a packet switching (PS) service or a videophone service in a circuit switching (CS) service, the application subsystem selecting the 3G network, and when the initiated service is the CS service except the videophone service, the application subsystem selecting the 2G network; and when the selected 2G network or 3G network meets a condition of signal intensity, the wireless communication subsystem corresponding to the selected network performing communication through the selected 2G network or 3G network.

3. The method according to claim 2, further comprising:
when the initiated service is the PS service and the application subsystem selects the 3G network, if the application subsystem judges that the PS service is unable to be initiated according to a current signal intensity of the 3G network monitored by the 3G wireless communication subsystem, notifying the 2G wireless communication subsystem to activate a 2G data link of the 2G network and initiating the service;

when the initiated service is the PS service, in a process of the 3G wireless communication subsystem performing communication through the 3G network, if the application subsystem judges that the current signal intensity of the 3G network is weakened to be unable to bear the PS service according to the current signal intensity of the 3G network monitored by the 3G wireless communication subsystem, then the application subsystem notifying the 3G wireless communication subsystem and the 2G wireless communication subsystem to switch a packet data protocol (PDP) data link corresponding to the PS service from a 3G data link to the 2G data link.

4. The method according to claim 3, further comprising:
when the 2G wireless communication subsystem uses the 2G data link to perform the PS service, and when the application subsystem judges that the current signal intensity of the 3G network is enhanced to be able to bear the PS service according to the current signal intensity of the 3G network monitored by the 3G wireless communication subsystem, then the application subsystem notifying the 3G wireless communication subsystem and the 2G wireless communication subsystem to switch the PDP data link corresponding to the PS service from the 2G data link to the 3G data link.

5. The method according to claim 1, wherein,
in the step of the 2G wireless communication subsystem reading information in the identity identification card in the identity identification module and storing the information in the identity identification card into said first virtual identity identification card administration module, the 2G wireless communication subsystem stores one or more of three parameters, namely a public land mobile network (PLMN) identification, a Temporary Mobile Subscriber Identity (TMSI) and a Location Area Identification (LAI) in the identity identification card, into the first virtual identity identification card administration module.

6. The method according to claim 1, further comprising:
in a process of the 3G wireless communication subsystem communicating with the 3G network, if an International Mobile Subscriber Identification Number (IMSI) of the identity identification card needs to be sent to the 3G network, then the 3G wireless communication subsystem asynchronously accessing the identity identification card in the identity identification module through the 2G wireless communication subsystem and obtaining the IMSI of the identity identification card.

7. The method according to claim 1, wherein,
the 3G network is a Time Division-Synchronous Code Division Multiple Access (TD-SCDMA) network, a Wideband Code Division Multiple Access (WCDMA) network or a CDMA2000 network, and the 2G network is a global system for mobile communications (GSM) network or a Code Division Multiple Access (CDMA) network.

8. An apparatus for performing communication by a dual network terminal, characterized in that
the dual network terminal is a dual network and dual standby terminal, and the apparatus comprises an application subsystem, a third generation mobile communication (3G) wireless communication subsystem, a second generation mobile communication (2G) wireless communication subsystem and an identity identification module, wherein,
the 2G wireless communication subsystem is respectively connected with the application subsystem, the identity identification module and the 3G wireless communication subsystem, and the 3G wireless communication subsystem is connected with the application subsystem and the 2G wireless communication subsystem, and a wireless protocol stack of the 2G wireless communication subsystem comprises a first virtual identity identification card administration module, and a wireless protocol stacks of the 3G wireless communication subsystem comprises a second virtual identity identification card administration module, wherein, the dual network terminal includes only one identity identification card which is inserted in the identity identification module, and the identity identification card is configured to store information for 2G network and 3G network to perform identity authentication;

the 2G wireless communication subsystem is configured to read information in the identity identification card in the identity identification module, store the information in the identity identification card into said first virtual identity identification card administration module, and communicate with the 2G network by using the information of the identity identification card in the first virtual identity identification card administration module; and the 3G wireless communication subsystem is configured to read the information of the identity identification card in the first virtual identity identification card administration module of the 2G wireless communication subsystem into said second virtual identity identification card administration module, and communicate with the 3G network by using the information of the identity identification card in the second virtual identity identification card administration module.

9. The apparatus according to claim 8, wherein the application subsystem is configured to: when a user of the dual network and dual standby terminal initiates a service, select a network according to a type of the service, and when the initiated service is a packet switching (PS) service or a videophone service in a circuit switching (CS) service, select the 3G network and notify the 3G wireless communication subsystem, and when the initiated service is the CS service except the videophone service, select the 2G network and notify the 2G wireless communication subsystem;

the 3G wireless communication subsystem is further configured to: monitor a current signal intensity of the 3G network, and notify the current signal intensity of the 3G network to the application subsystem; and when the application subsystem selects the 3G network and the 3G network meets a condition of signal intensity, communicate through the 3G network;

the 2G wireless communication subsystem is further configured to: when the application subsystem selects the 2G network and the 2G network meets the condition of the signal intensity, communicate through the 2G network.

10. The apparatus according to claim 9, wherein, the application subsystem is further configured to: when the initiated service is the PS service and when judging that the PS service is unable to be initiated according to the current signal intensity of the 3G network monitored by the 3G wireless communication subsystem, notify the 2G wireless communication subsystem to activate a 2G data link of the 2G network and initiate the PS service; and when the initiated service is the PS service, in a process of performing communication through the 3G network, if judging that the current signal intensity of the 3G network is weakened to be unable to bear the PS service according to the current signal intensity of the 3G network monitored by the 3G wireless communication subsystem, notify the 3G wireless communication subsystem and the 2G wireless communication subsystem to switch a packet data protocol (PDP) data link corresponding to the PS service from a 3G data link to the 2G data link; and when the 2G wireless communication subsystem uses the 2G data link to perform the PS service, and when judging that the current signal intensity of the 3G network is enhanced to be able to bear the PS service according to the current signal intensity of the 3G network monitored by the 3G wireless communication subsystem, notify the 3G wireless communication subsystem and the 2G wireless communication subsystem to switch the PDP data link corresponding to the PS service from the 2G data link to the 3G data link.

11. The apparatus according to claim 8, wherein, the 2G wireless communication subsystem is further configured to: when reading information in the identity identification card in the identity identification module and storing the information in the identity identification card into the first virtual identity identification card administration module, store one or more of three parameters, namely a public land mobile network (PLMN) identification, a Temporary Mobile Subscriber Identity (TMSI) and a Location Area Identification (LAI) in the identity identification card, into the first virtual identity identification card administration module.

12. The apparatus according to claim 8, wherein, the 3G wireless communication subsystem is further configured to: in a process of communicating with the 3G network, if an International Mobile Subscriber Identification Number (IMSI) of the identity identification card needs to be sent to the 3G network, then asynchronously access the identity identification card in the identity identification module through the 2G wireless communication subsystem and obtain the IMSI of the identity identification card.

13. The apparatus according to claim 9, wherein, the 3G network is a Time Division-Synchronous Code Division Multiple Access (TD-SCDMA) network, a Wideband Code Division Multiple Access (WCDMA) network or a CDMA2000 network, and the 2G network is a global system for mobile communications (GSM) network or a Code Division Multiple Access (CDMA) network.

* * * * *